United States Patent [19]

Terada et al.

[11] Patent Number: 5,969,009
[45] Date of Patent: Oct. 19, 1999

[54] MOLDING MATERIAL AND MOLDED MOTOR

[75] Inventors: Takahiko Terada, Nara; Yoshikazu Yamagata, Katano; Hiroshi Onishi, Hirakata, all of Japan

[73] Assignee: Matsushita Electric Industrial Co, Ltd., Osaka, Japan

[21] Appl. No.: 08/860,903

[22] PCT Filed: Nov. 28, 1996

[86] PCT No.: PCT/JP96/03497

§ 371 Date: Aug. 14, 1997

§ 102(e) Date: Aug. 14, 1997

[87] PCT Pub. No.: WO97/19967

PCT Pub. Date: Jun. 5, 1997

[30] Foreign Application Priority Data

Nov. 30, 1995 [JP] Japan ................................ 7-312768
May 31, 1996 [JP] Japan ................................ 8-139020

[51] Int. Cl.$^6$ .................................................... C08L 67/06
[52] U.S. Cl. ............................................................. 523/526
[58] Field of Search ............................................. 523/526

[56] References Cited

U.S. PATENT DOCUMENTS

| | | | |
|---|---|---|---|
| 3,878,137 | 4/1975 | Hess | 523/509 |
| 3,988,388 | 10/1976 | Alberts | 525/166 |
| 3,993,710 | 11/1976 | Alberts | 523/505 |
| 3,997,627 | 12/1976 | Ichimura | 523/508 |
| 4,035,439 | 7/1977 | Stevenson | 525/44 |
| 4,245,059 | 1/1981 | Ichimura | 525/168 |
| 4,288,571 | 9/1981 | Comstock | 525/169 |
| 4,329,438 | 5/1982 | Yamori | 525/64 |
| 4,626,570 | 12/1986 | Gardner | 525/12 |
| 4,673,706 | 6/1987 | Atkins | 525/31 |
| 5,098,950 | 3/1992 | Kagaya et al. | 525/28 |
| 5,362,804 | 11/1994 | Oshima | 525/64 |
| 5,491,184 | 2/1996 | McBain et al. | 523/436 |
| 5,512,339 | 4/1996 | Dujardin et al. | 428/35.7 |

FOREIGN PATENT DOCUMENTS

| | | |
|---|---|---|
| 51-140990 | 12/1976 | Japan . |
| 54-73205 | 6/1979 | Japan . |
| 60-7663 | 2/1985 | Japan . |
| 4-156247 | 5/1992 | Japan . |
| 4-332757 | 11/1992 | Japan . |
| 6-192345 | 7/1994 | Japan . |
| 7-298538 | 11/1995 | Japan . |
| 8-113619 | 5/1996 | Japan . |
| 9-3184 | 1/1997 | Japan . |
| WO95/29205 | 11/1995 | WIPO . |

*Primary Examiner*—Paul R. Michl
*Attorney, Agent, or Firm*—Panitch Schwarze Jacobs & Nadel, P.C.

[57] ABSTRACT

Disclosed is a molding material which can be easily decomposed by using an alkaline solution. This molding material comprises, as a binder, a thermosetting composition of an unsaturated polyester, an addition-polymerizable monomer and a low shrink agent, the addition-polymerizable monomer containing a monomer having an affinity for alkaline solution. As the addition-polymerizable monomer, there can be used a compound having an ethylene bond and a carbonyl or sulfonyl group, e.g. carboxylic and sulfonic acids, and metal salts, esters and acid anhydrides of these acids. There is also disclosed a molded motor comprising a molded part of an iron core, a winding and the above molding material, the molded part being integrally molded so as to coat at least one part of the iron core and winding with the molding material.

7 Claims, 1 Drawing Sheet

MOLDING MATERIAL AND MOLDED MOTOR

The present invention relates to a molding material which is superior in strength and heat resistance and is capable of easily performing waste disposal after use, and a molded motor using the molding material.

BACKGROUND ART

Although thermosetting resins comprising an unsaturated polyester and an addition-polymerizable resin as a skeleton are sometimes used alone, they are exclusively used as a composite material and about 80% of them produced are used as a fiber reinforced plastic (FRP). These thermosetting resins are applied to molding materials, laminates, adhesives, paints, etc. because formulation of fillers and additives (e.g. inorganic materials, etc.) and reinforcement by fibers are easily performed.

On the other hand, a three-dimensional structure is imparted to these resins by a curing reaction to convert into an insoluble/non-fusible solid. Therefore, it has hitherto been considered that these thermosetting resins are not easily decomposed and are not suitable for regeneration treatment and reuse, which results in disposal of them.

Molding materials are molding compounds prepared by filling inorganic materials (e.g. glass fiber, calcium carbonate, talc, silica, etc.) or organic materials (e.g. pulp, wood, etc.) into a resin as a binder. These molding materials are used for various applications in the industrial and household fields because large specific strength and specific rigidity are obtained by filling them.

Since these molding materials are composite materials, it is generally difficult to perform regeneration treatment after use. Furthermore, if the binder resin is a thermosetting resin, a three-dimensional structure is imparted to the binder resin by a curing reaction to convert into an insoluble/non-fusible solid. Therefore, it has hitherto been considered that the binder resin is not easily decomposed and is not suitable for regeneration treatment and reuse, which results in disposal of it. As the problem about wastes has attracted special interest recently, the development of the reuse/regeneration technique has been required and a study of conversion into raw materials by heat decomposition has started. However, advantages of the thermosetting resin or molding material (e.g. hardness, magnification of strength, heat resistance, non flammability, chemical resistance, etc.) make it difficult to perform waste disposal from the technical point of view.

Recently, an apparatus using a molding material comprising a thermosetting resin as a binder, e.g. molded motor, has been applied to household apparatuses, industrial apparatuses, business apparatuses and the like. Since the molded motor is superior in silent running properties, vibration-damping properties, insulating properties and maintainability and is capable of easily performing automated production because of compact size, its demand has been rapidly increased.

A molded stator of a molded motor, which has hitherto been used as A.C. motor, brushless D.C. motor and the like, generally has a construction, for example, disclosed in Japanese Laid-Open Patent Publication No. 1-214740. The molding material used herein contains a thermoplastic resin (e.g. polyethylene terephthalate, polyethylene, polypropylene, nylon, etc.) or a thermosetting resin (e.g. unsaturated polyester, vinyl ester resin, phenol resin, etc.) as a binder and further contains an additive (e.g. calcium carbonate, talc, carbon black, etc.).

The issue on wastes has become more serious and the urgent development of a volume-reduction technique and a disposal technique for reuse of discarded thermosetting compositions or molded articles of molding materials is required. Particularly, a large amount of fiber-reinforced unsaturated polyester resins are used for the production of fishing boats, tanks or large products such as housing materials and, therefore, problems about decomposition and regeneration treatment of wastes are serious. The molding materials comprising a thermosetting resin as a binder are exclusively used as a structural material because of magnification of strength and sometimes contain other materials such as metal. The metal is a valuable material which is expensive in comparison with a resin material and its possibility of inhibiting regeneration and reuse is a serious problem. That is, according to a conventional construction and disposal method, the problem about wastes remains unsolved with respect to the molded article of molding material at present.

At disposal of the molded motor, it is preferred to remove the molding material, thereby recycling metals (e.g. iron core, winding, etc.) as valuables. In conventional waste disposal, valuable materials are recycled by firstly shredding a molding material using a shredder and then selecting the valuable materials (e.g. iron core, winding, etc.) from shreds. Regarding the molded motor having the above-described construction, a shredding process is avoided because teeth of the shredder are easily damaged by the iron core and winding. Therefore, the molded motor is discarded without recycling the valuable materials, and buried under the ground, together with other wastes. Since the above-described molding material is not naturally decomposed by burying under the ground, silicon steel plates, copper wires, etc. used for the iron core and winding are buried without recycling in spite of high material value even after used as a motor. Furthermore, a conventional decomposition method such as volume reduction by heat decomposition can not be applied to the thermosetting resin used as the molding material. Accordingly, a conventional molded motor has a problem that shredding and decomposition of the molding material can not be applied and it is difficult to reuse valuable materials (e.g. iron core, winding, etc.) at disposal.

Accordingly, the primary object of the present invention is to provide a molding material capable of easily performing waste disposal.

Another object of the present invention is to provide a molded motor which can be separated and divided.

DISCLOSURE OF THE INVENTION

The present invention provides a molding material comprising, as a binder, a thermosetting composition of an unsaturated polyester, an addition-polymerizable monomer and a low shrink agent, the addition-polymerizable monomer containing a monomer having an affinity for alkaline solution.

As the monomer having an affinity for alkaline solution, a monomer having an ethylene bond and a carbonyl or sulfonyl group is preferably used. More specifically, a compound selected from the group consisting of a carboxylic acid having an ethylene bond, a sulfonic acid having an ethylene bond, a metal salt of the carboxylic or sulfonic acid, a first ester synthesized from the carboxylic or sulfonic acid and an alcohol, an amide synthesized from the carboxylic or sulfonic acid and an amine, a second ester synthesized from an alcohol having an ethylene bond and a carboxylic or sulfonic acid, and an acid anhydride having an ethylene bond is preferred.

In one preferred mode of the present invention, the low shrink agent is a thermoplastic polyester.

In another preferred mode of the present invention, the molding material contains, as a binder, a thermosetting composition of an unsaturated polyester, an addition-polymerizable monomer and a low shrink agent, and the addition-polymerizable monomer contains at least one selected from hydroxyethyl acrylate and hydroxyethyl methacrylate.

In this molding material, the above low shrink agent is preferably at least one selected from the group consisting of polycaprolactone, polydipropylene adipate, polypropylene adipate, polydipropylene phthalate, polypropylene phthalate, polyvinyl acetate, a butadiene-styrene-methyl methacrylate copolymer, polyhydroxyethyl methacrylate and a ketone resin.

In the above molding material, a molar fraction of hydroxyethyl acrylate and/or hydroxyethyl methacrylate in the addition-polymerizable monomer is preferably not less than 0.4.

A molded motor of the present invention comprises a molded part of an iron core, a winding and a molding material, the molded part being integrally molded so as to coat at least one part of the iron core and winding with the molding material, the molding material containing, as a binder, a thermosetting composition of an unsaturated polyester, an addition-polymerizable monomer and a low shrink agent, the addition-polymerizable monomer containing a monomer having an affinity for alkaline solution.

BEST MODE FOR CARRYING OUT THE INVENTION

Figure 1:
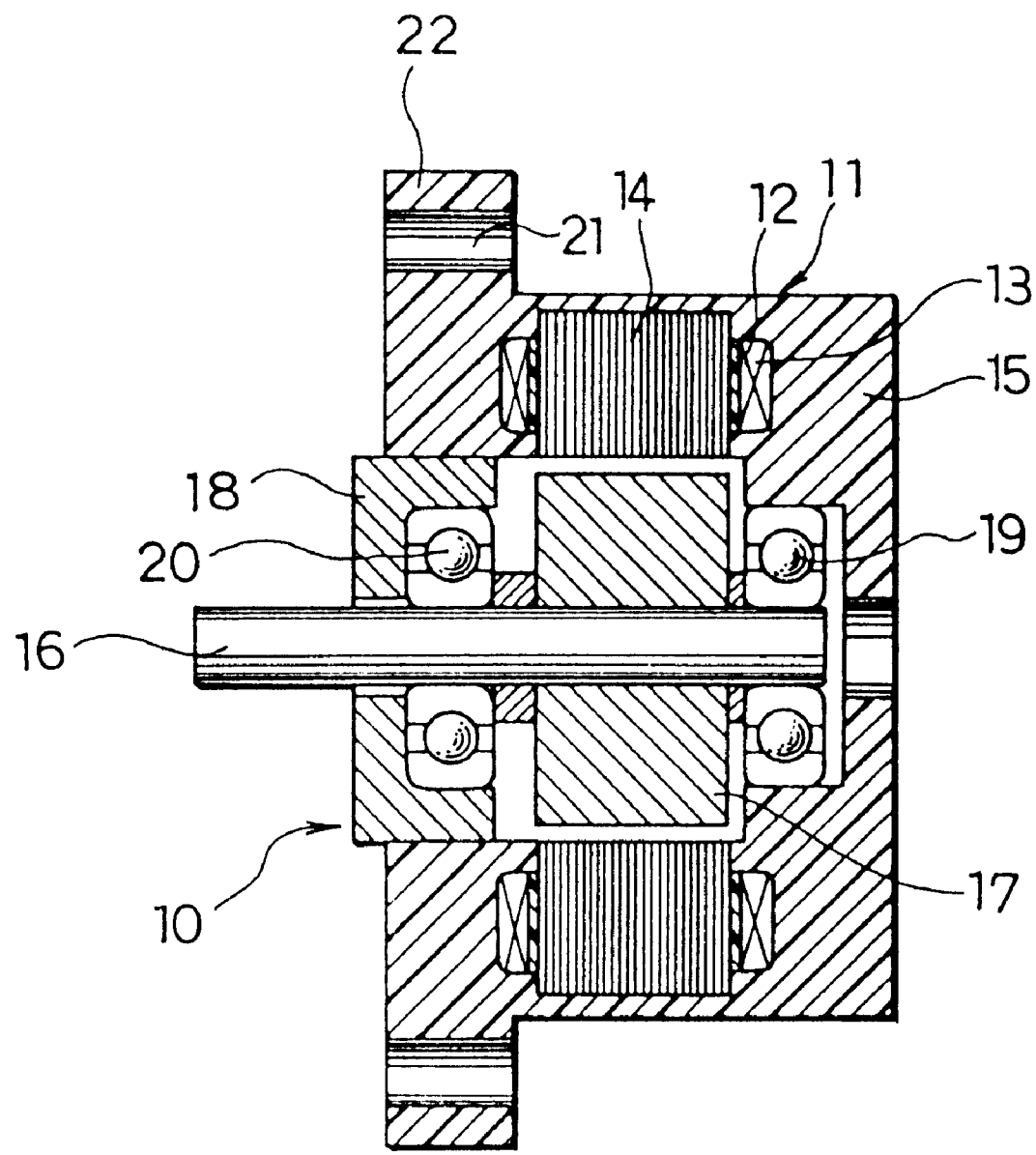
FIG. 1 is a schematic cross-sectional view illustrating one embodiment of the molded motor of the present invention.

As described above, the present invention is directed to a molding material comprising, as a binder, a thermosetting composition of an unsaturated polyester, an addition-polymerizable monomer and a low shrink agent, the addition-polymerizable monomer containing a monomer having an affinity for alkaline solution.

This molding material is constructed so that the thermosetting composition for a binder has a high affinity for alkaline solution. Accordingly, if the molding material is dipped in the alkaline solution, the alkaline solution easily permeates into the molding material and an ester bond in the unsaturated polyester resin is solvolyzed. Therefore, the molding material is disintegrated and swells as a result of further permeation of the alkaline solution, thereby making it easy to perform waste disposal such as peeling and the like.

The materials constituting the molding material of the present invention will be explained in detail below.

The unsaturated polyester used for the binder of the molding material of the present invention is obtained by polycondensing an unsaturated polybasic acid and a saturated polybasic acid with glycols according to a known method. Examples of the unsaturated polybasic acid include maleic anhydride, fumaric acid, itaconic acid, citraconic acid and the like. Examples of the saturated polybasic acid include maleic anhydride, isophthalic acid, terephthalic acid, adipic acid, sebacic acid, tetrahydromaleic anhydride, methyltetrahydrophthalic anhydride, endomethylenetetrahydrophthalic anhydride, Het acid, tetrabromophthalic anhydride and the like.

Examples of the glycols include ethylene glycol, propylene glycol, diethylene glycol, dipropylene glycol, neopentyl glycol, 1,3-butanediol, 1,6-hexanediol, hydrogenated bisphenol A, a bisphenol A propyleneoxide compound, dibromoneopentyl glycol and the like.

Examples of the preferred unsaturated polyester include copolymers represented by the following formula (1) of isophthalic acid, fumaric acid and neopentyl glycol, copolymers represented by the formula (2) of phthalic anhydride, fumaric anhydride and propylene glycol, copolymers represented by the formula (3) of isophthalic acid, maleic anhydride and propylene glycol and the like.

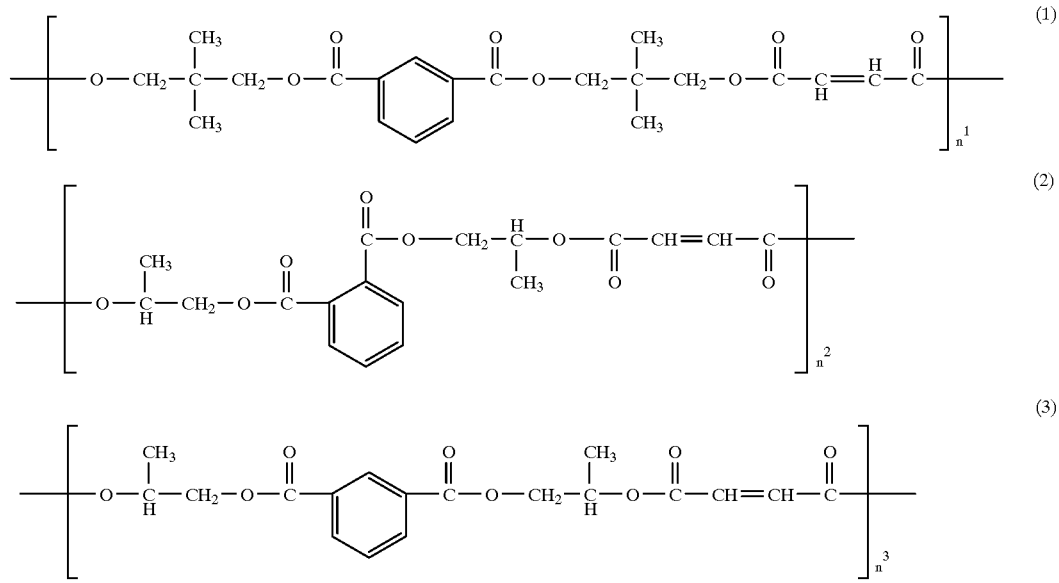

In the above formulae, $n^1$ to $n^3$ independently indicate an integer of 1 to 30.

The above unsaturated polyester is actually provided as a solution product prepared by dissolving it in a polymerizable monomer.

As the addition-polymerizable monomer used for the molding material of the present invention, a monomer having an affinity for alkaline solution is used. That is, it is a monomer having strong interaction with the alkaline solution, preferably monomer having high solubility in the alkaline solution.

In the present invention the alkaline solution may contain at least a basic compound and a solvolyzing solvent. Examples of the basic compound include metal hydroxides such as sodium hydroxide, potassium hydroxide and the like; metal oxides such as calcium oxide and the like; and metal alkoxides such as sodium ethoxide, potassium ethoxide and the like. The solvolyzing solvent means a solvent which can cause a substitution reaction using itself as a nucleophile. Examples thereof include water, methanol, ethanol, ethylene glycol, thiol, hydrazine and the like. It is also possible to use one which is not only a base but also a solvolyzing solvent (e.g. diethanolamine, etc.) alone.

The preferred addition-polymerizable monomer used for the molding material of the present invention is a monomer having an ethylene bond and a carbonyl or sulfonyl group. Since the carbonyl and sulfonyl groups have a polarization structure wherein a carbon or sulfur atom is positively charged, they attract a negative charge in a base of the alkaline solution and cause a nucleophilic substitution reaction by the negative charge of the base. Accordingly, the monomer is easily subjected to permeation of the alkaline solution and chemical decomposition.

Carboxylic acid or sulfonic acid is the above monomer wherein a hydroxyl group is bonded to the carbonyl or sulfonyl group. These acids have extremely high affinity for alkaline solution. Preferred examples of these acids include acrylic acid, methacrylic acid, crotonic acid, maleic acid, fumaric acid, itaconic acid, citraconic acid, vinylacetic acid, vinylsulfonic acid, vinylstyrenesulfonic acid and the like.

A compound wherein hydrogen in the hydroxyl group bonded to the carbonyl or sulfonyl group is substituted with a metal has a high affinity for alkaline solution. The affinity for aqueous alkaline solution is particularly high and, therefore, the compound is easily subjected to permeation of the alkaline solution and chemical decomposition. Preferred examples thereof include metal salts of the above carboxylic or sulfonic acid, such as sodium acrylate, potassium acrylate, sodium methacrylate, potassium methacrylate, sodium styrenesulfonate, sodium vinylsulfonate and the like.

Preferred examples of the monomer having the above ethylene bond and carbonyl or sulfonyl group include esters synthesized from the above carboxylic or sulfonic acid and an alcohol. Among them, a first ester having at least one substituent selected from the group consisting of hydroxyl, methoxy, ethoxy, amino, monomethylamino, monoethylamino, dimethylamino, diethylamino, methylethylamino, carboxyl and sulfonic groups is preferred. A first ester having a carbonyl or sulfonyl group to which an alkoxyl group having at least one substituent selected from the group consisting of hydroxyl, methoxy, ethoxy, amino, monomethylamino, monoethylamino, dimethylamino, diethylamino, methylethylamino, carboxyl and sulfonic groups is bonded is particularly preferred.

As the ester, there is a second ester synthesized from an alcohol having an ethylene bond and a carboxylic or sulfonic acid. As the second ester, those having at least one substituent selected from the group consisting of hydroxyl, methoxy, ethoxy, amino, monomethylamino, monoethylamino, dimethylamino, diethylamino, methylethylamino, carboxyl and sulfonic groups are preferred.

These esters have an affinity for alkaline solution, and are solvolyzed by the alkaline solution and dissociated. Therefore, the alkaline solution further permeates into these esters and, therefore, an ester bond of an unsaturated polyester is also solvolyzed and a binder resin is disintegrated. At the same time, the esters swell due to permeation of the alkaline solution, thereby making it easy to perform waste disposal such as shredding, peeling and the like.

Preferred examples of the first ester include hydroxypropyl acrylate, hydroxypropyl methacrylate, dimethylaminopropyl acrylate, dimethylaminopropyl methacrylate, diethylaminoethyl acrylate, diethylaminoethyl methacrylate, hydroxyethyl styrenesulfonate and hydroxyethyl vinylsulfonate.

Particularly, hydroxypropyl acrylate and hydroxypropyl methacrylate have a hydroxyl group and, furthermore, they have not only a high affinity for alkaline solution but also a high capability of dissolving the unsaturated polyester and dissolve the thermoplastic polyester as the low shrink agent (e.g. polydipropylene adipate, polypropylene adipate, etc.) and, therefore, the flexibility is large. Since they have good compatibility with styrene as the addition-polymerizable monomer which has hitherto been used, they can also be used in combination.

Preferred examples of the second ester include vinyl hydroxypropionate, vinyl aminoacetate, vinyl 2-amino-3-hydroxypropionate, vinyl dimethylaminopropionate, vinyl hydroxyacetate and the like.

Preferred examples of the above monomer having the ethylene bond and carbonyl or sulfonyl group include acid amide or sulfonamide synthesized from the above carboxylic or sulfonic acid and amine. Among them, an acid amide or sulfonamide having at least one substituent selected from the group consisting of hydroxyl, methoxy, ethoxy, amino, monomethylamino, monoethylamino, dimethylamino, diethylamino, methylethylamino, carboxyl and sulfonic groups is preferred. An acid amide or sulfonamide having a carbonyl or sulfonyl group to which at least one substituent selected from the group consisting of hydroxyl, methoxy, ethoxy, amino, monomethylamino, monoethylamino, dimethylamino, diethylamino, methylethylamino, carboxyl and sulfonic groups is bonded is particularly preferred.

These amides have an affinity for alkaline solution, particularly alkaline aqueous solution and are solvolyzed by the alkaline solution and dissociated. Therefore, the alkaline solution further permeates into these esters and, therefore, an ester bond of an unsaturated polyester is also solvolyzed and a binder resin is disintegrated. At the same time, the esters swell due to permeation of the alkaline solution, thereby making it easy to perform waste disposal such as shredding, peeling and the like.

Preferred examples of the acid amide and sulfonamide include hydroxymethylacrylamide, hydroxymethylmethacrylamide, dimethylaminopropylacrylamide, dimethylaminopropylmethacrylamide, 2-acrylamide-2-methylpropanesulfonic acid, N,N-dimethylvinylsulfonic acid amide, N,N-hydroxymethylvinylsulfonic acid amide and the like.

Preferred examples of the above monomer having the ethylene bond and carbonyl group include acid anhydrides.

The acid anhydride has high reactivity to and solubility in alkaline. Preferred acid anhydride includes maleic anhydride, itaconic anhydride, citraconic anhydride and the like.

It is also possible to use in combination with styrene, vinyltoluene, α-methylstyrene and the like, in addition to the above addition-polymerizable monomer.

The monomer is preferably contained in an amount within the range from 25 to 150 parts by weight, more preferably from 40 to 100 parts by weight, based on 100 parts by weight of the above unsaturated polyester.

The addition-polymerizable monomer as a feature of the present invention is preferably contained in an amount within the range from 5 to 100 parts by weight, more preferably from 40 to 80 parts by weight, based on 100 parts by weight of the total monomer. When the amount is less than 5 parts by weight, the effect of the decomposition treatment by the alkaline solution containing at least a base and a solvolyzing solvent is small. On the other hand, when the amount exceeds 80 parts by weight, the solubility of the unsaturated polyester in the monomer and copolymerizability with an unsaturated bond in the unsaturated polyester are sometimes deteriorated.

The low shrink agent used for the molding material of the present invention is preferably a thermoplastic polyester. Among the thermoplastic polyesters, for example, polymers represented by the formula (4) obtained by ring opening polymerization of lactone, such as polycaprolactone, polypropiolactone and the like; and copolymers represented by the formula (5) of a glycol and an aliphatic dicarboxylic acid, such as polycaprolactone, polypropiolactone, polyethylene adipate, polybutylene adipate, polydipropylene adipate, polypropylene adipate, polyethylene succinate, polybutylene succinate, polydipropylene succinate, polypropylene succinate, polyethylene phthalate, polypropylene phthalate, polydipropylene phthalate, polybutylene phthalate, polyethylene isophthalate, polypropylene isophthalate, polydipropylene isophthalate and polybutylene isophthalate and the like are preferred. These polyesters exhibit good low shrink properties and have extremely excellent decomposition properties for alkaline solution if combined with the addition-polymerizable monomer in the molding material of the present invention.

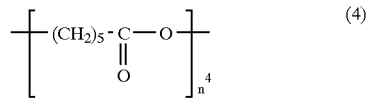  (4)

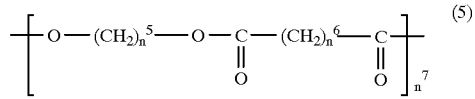  (5)

In the formulae (4) and (5), $n^4$ to $n^7$ independently indicate an integer of 10 to 2,000.

The above polyester is preferably contained in an amount within the range from 1 to 100 parts by weight, more preferably from 2 to 50 parts by weight, based on 100 parts by weight of the above unsaturated polyester.

In the molding material of the present invention, when hydroxyethyl acrylate or hydroxyethyl methacrylate is used as the addition-polymerizable monomer, it is preferred to use polycaprolactone, polydipropylene adipate, polypropylene adipate, polydipropylene phthalate, polypropylene phthalate, polyvinyl acetate, a butadiene-styrene-methyl methacrylate copolymer (MBS resin), polyhydroxyethyl methacrylate or a ketone resin as the low shrink agent. These low shrink agents can be provided in the solution state because they show good solubility in the above-described addition-polymerizable monomer, acrylic acid-hydroxyethyl or methacrylic acid-hydroxyethyl. Accordingly, a binder resin composition is easily prepared.

It is also possible to use thermoplastic resins such as polyethylene, polypropylene, polystyrene, poly(ethylene vinyl alcohol), an acrylic copolymer, a methacrylic copolymer, a styrene-butadiene block copolymer, an acrylonitrile-butadiene-styrene copolymer and the like in combination, as the low shrink agent used for the molding material of the present invention.

It is preferred that the molding material of the present invention further contains at least one aliphatic polyester selected from the group consisting of polylactic acid, polyglycolic acid, polycaprolactonediol, polycaprolactonetriol and a copolymer of 3-hydroxyalkanoate. These aliphatic polyesters can be decomposed by the alkaline solution because of good affinity for alkaline solution. Therefore, they improve the affinity of the molding material for alkaline solution.

The molding material of the present invention preferably contains a curing agent.

Examples of the curing agent include benzoyl peroxide, tert-butyl perbenzoate, tert-butyl peroxybenzoate, tert-butyl peroxylaurate, tert-butyl peroxy-2-ethylhexanoate, tert-butyl peroctoate, 2,5-dimethyl-2,5-di(tert-butylperoxy) hexane, 1,1-bis(tert-butylperoxy)3,3,5-trimethylcyclohexane and the like.

These curing agents are preferably contained in an amount within the range from 0.1 to 5 parts by weight, more preferably from 0.2 to 4 parts by weight, based on 100 parts by weight of the above unsaturated polyester.

If necessary, fillers, thickeners, release agents, wax, colorants and the like can be added to the molding material of the present invention.

Examples of the filler include carbonates such as calcium carbonate, magnesium carbonate and the like; sulfates/sulfites such as calcium sulfate, barium sulfate, calcium sulfite and the like; silicates such as clay, mica, glass balloon, montmorillonite, silicic acid, kaolin, talc and the like; oxides such as silica, diatomaceous earth, iron oxide, pumice balloon, titanium oxide, alumina and the like; hydroxides such as aluminum hydroxide, magnesium hydroxide and the like; inorganic fillers such as graphite, glass fiber, carbon fiber, asbestos fiber and the like; and organic fillers such as wood powder, chaff, cotton, paper strip, nylon fiber, polyethylene fiber, wood, pulp, cellulose and the like.

These fillers are preferably added in an amount within the range from 5 to 600 parts by weight, more preferably from 20 to 500 parts by weight, based on 100 parts by weight of the thermosetting composition. The mechanical strength of the molding material is improved by adding these fillers in the amount within the above range.

Examples of the thickener include beryllium oxide, magnesium oxide, magnesium hydroxide, calcium oxide, calcium hydroxide, zinc oxide, benzoic acid, phthalic anhydride, tetrahydrophthalic anhydride, maleic anhydride and the like.

Examples of the release agent include stearic acid, zinc stearate, calcium stearate and the like.

Examples of the wax include Hoechst wax, carnauba wax, paraffin and the like.

Examples of the colorant include titan white, chromium oxide, carbon black and the like.

The molded motor of the present invention is composed of the above molding material. Hereinafter the preferred embodiment of the molded stator according to the present invention will be explained in detail with reference to the drawing.

FIG. 1 is a schematic cross-sectional view illustrating one embodiment of the molded motor having the molded stator of the present invention. The molded motor is composed of a motor part 10 and a molded stator 11. The molded stator 11 comprises an iron core 14 on which a winding 12 is wound through an insulating material 12, and a molded part 15 which is integrally molded with a molding material so as to coat the iron core 14 and fill the total molded stator with the molding material. The motor part 10 is mounted to an opening part of the molded part 15 and provided with at least a rotor shaft 16 and a rotor 17 mounted to the rotor shaft and, further, the motor part is supported by a blanket 18. The rotor 17 is pivotably supported by a bearing 19 mounted at the upper wall of the opening part and a bearing 20 mounted at the blanket.

The terminal end (not shown) of the winding 13 extends to the part located on the shaft of the molded stator, where the terminal end is connected with a lead wire and an input from the outer part can be performed. Furthermore, the molded stator 11 may be provided with a flange part 22 having a plurality of mounting holes 21. A thickness of the maximum thickness part of the molded part 15 is normally about 10 mm.

What constitutes the molded part 15 is the above-described molding material of the present invention.

The thickness of the maximum thickness part of the molded part can vary depending on the application. In the present invention, the thickness is preferably from 1 to 10 mm, more preferably from 1 to 8 mm, most preferably from 1 to 5 mm.

As the insulating material 12, for example, thermoplastic resins such as aliphatic polyester, polyethylene terephthalate, polyethylene and the like may be used. Since the shape retention effect of the winding 13 at the time of molding is required for the insulating material 12, those having a softening or melting point which is the temperature at the time of molding, e.g. not less than about 100° C. are preferred so that the insulating material is not softened at the time of molding. When the aliphatic polyester is used as the insulating material 12, it is possible to separate the winding 13 and iron core 14 at decomposition and, it is particularly preferred. Examples of the aliphatic polyester having a melting point exceeding 100° C. include copolymer resins represented by the formula (6):

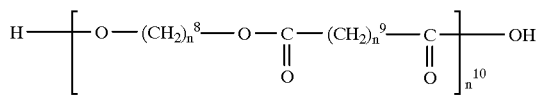

(6)

In the formula, $n^8$ to $n^{10}$ independently indicate an integer of 10 to 2,000.

The molded stator of the present invention can be easily decomposed by appropriately combining the constructions of the above preferred embodiments.

The molded stator of the present invention is applied to brushless D.C. motor, A.C. motor, linear motor and the like.

The following Test Samples further illustrate the Examples of the molding material of the present invention in detail.

<EXAMPLE 1>

Test Sample 1-1:

To 15.6 parts by weight of an unsaturated polyester (manufactured by Nippon Shokubai Co., Ltd., trade name: Epolac), added were 9.1 parts by weight of styrene as the addition-polymerizable monomer, 1.8 parts by weight of polycaprolactone (molecular weight: 40,000, manufactured by Daicel Chemical Industries, Ltd., trade name: Placcel) as the thermoplastic polyester, 3.5 parts by weight of acrylic acid and 0.3 parts by weight of 2,5-dimethyl-2,5-di(tert-butylperoxy)hexane (manufactured by NOF Corporation, trade name: Perhexa 25B) as the curing agent, followed by sufficient mixing to obtain a composition for a binder.

Then, 57 parts by weight of calcium carbonate as the filler, 2 parts by weight of zinc stearate as the release agent and 1 part by weight of magnesium oxide as the thickener were transferred to a kneader, followed by dry mixing. About 5 minutes after mixing, the previously mixed binder composition was gradually added to this uniformly mixed dry mixture, followed by kneading to obtain a uniform pasty substance.

To this pasty substance, 10 parts by weight of glass fibers were added with uniformly dispersing in the shortest possible time. The kneading was completed when the glass fibers were wetted and uniformly dispersed. In such way, a molding material was obtained.

Test Sample 1-2:

To 15.6 parts by weight of an unsaturated polyester (manufactured by Nippon Shokubai Co., Ltd., trade name: Epolac), added were 9.1 parts by weight of styrene as the addition-polymerizable monomer, 1.8 parts by weight of polystyrene (molecular weight: 40,000) as the low shrink agent, 3.5 parts by weight of acrylic acid and 0.3 parts by weight of 2,5-dimethyl-2,5-di(tert-butylperoxy)hexane (manufactured by NOF Corporation, trade name: Perhexa 25B) as the curing agent, followed by sufficient mixing to obtain a composition for a binder.

According to the same manner as that described in Test Sample 1-1 except for using the above binder composition, a molding material was obtained.

Test Sample 1-3:

To 14.5 parts by weight of an unsaturated polyester (manufactured by Nippon Shokubai Co., Ltd., trade name: Epolac), added were 8.5 parts by weight of styrene as the addition-polymerizable monomer, 1.8 parts by weight of polycaprolactone (molecular weight: 40,000, manufactured by Daicel Chemical Industries, Ltd., trade name: Placcel) as the thermoplastic polyester, 5.2 parts by weight of 2 hydroxyethyl acrylate and 0.3 parts by weight of 2,5-dimethyl-2,5-di(tert-butylperoxy)hexane (manufactured by NOF Corporation, trade name: Perhexa 25B) as the curing agent, followed by sufficient mixing to obtain a composition for a binder.

According to the same manner as that described in Test Sample 1-1 except for using the above binder composition, a molding material was obtained.

<Comparative Example 1>

To 15.6 parts by weight of an unsaturated polyester (manufactured by Nippon Shokubai Co., Ltd., trade name: Epolac), were added 12.6 parts by weight of styrene as the addition-polymerizable monomer, 1.8 parts by weight of polycaprolactone (molecular weight: 40,000, manufactured by Daicel Chemical Industries, Ltd., trade name: Placcel) as the thermoplastic polyester and 0.3 parts by weight of tert-butyl peroxybenzoate (manufactured by NOF Corporation, trade name: Perbutyl Z) as the curing agent, followed by sufficient mixing to obtain a composition for a binder.

According to the same manner as that described in Test Sample 1-1 except for using the above binder composition, a molding material was obtained.

<Comparative Example 2>

To 15.6 parts by weight of an unsaturated polyester (manufactured by Nippon Shokubai Co., Ltd., trade name: Epolac), added were 12.6 parts by weight of styrene as the addition-polymerizable monomer, 1.8 parts by weight of polystyrene (molecular weight: 40,000) and 0.3 parts by weight of tert-butyl peroxybenzoate (manufactured by NOF Corporation, trade name: Perbutyl Z) as the curing agent, followed by sufficient mixing to obtain a composition for a binder.

According to the same manner as that described in Test Sample 1-1 except for using the above binder composition, a molding material was obtained. This molding material has a conventional composition.

The molding material thus obtained is a sort of a molding material which is normally referred to as "BMC (Bulk Molding Compound)" because it has a bulk-like shape. Therefore, the molding material is in a non-adhesive state although it contains a polymerizable monomer such as styrene.

Among compositions of these molding materials, various components of the monomer and low shrink agent are summarized in Table 1. Basic physical properties of these molding materials measured are shown in Table 2.

TABLE 1

|  | Monomer | Low shrink agent |
| --- | --- | --- |
| Test Sample 1-1 | Styrene + Acrylic acid | Polycaprolactone |
| Test Sample 1-2 | Styrene + Acrylic acid | Polystyrene |
| Test Sample 1-3 | Styrene + Hydroxyethyl acrylate | Polycaprolactone |
| Comparative Example 1 | Styrene | Polycaprolactone |
| Comparative Example 2 | Styrene | Polystyrene |

TABLE 2

|  | Spiral flow (cm) | Curing time (sec) | Mold shrinkage coefficient (%) | Bending strength (kgf/cm$^2$) |
| --- | --- | --- | --- | --- |
| Test Sample 1-1 | 88 | 132 | 0.08 | 6.0 |
| Test Sample 1-2 | 127 | 135 | 0.09 | 6.1 |
| Test Sample 1-3 | 120 | 130 | 0.07 | 5.1 |
| Comparative Example 1 | 84 | 144 | 0.07 | 5.5 |
| Comparative Example 2 | 126 | 147 | 0.09 | 6.0 |

The spiral flow is determined by measuring a length of a material extruded from a pore (flow length) and is exclusively utilized for judging a moldability of transfer molding or injection molding. It was measured under the conditions of a molding temperature of 150° C. and an injection pressure of 50 kgf/cm$^2$. Since all spiral flows of the Test Samples obtained in the Example are within the range of the value of Comparative Examples, no problem arises if molding is performed under the same molding conditions as those of the Comparative Examples.

The mold shrinkage coefficient illustrating a dimensional stability at the time of molding was determined under the molding conditions of a molding temperature of 150° C., a molding pressure of 100 kgf/cm$^2$ and a molding time of 10 minutes (JIS K6911). The mold shrinkage coefficient of the molding material of this Example was the same as that of a conventional mass-manufactured material of Comparative Example 2. There was no difference in curing time between the samples. In such way, the molding materials produced in this Example had sufficient moldability.

The strength of the molded article was measured as follows. The respective molding materials were molded into a flat plate (12.7 mm in width×127 mm in length×3.2 mm in height) by transfer molding under the conditions of a molding temperature of 150° C. and an injection pressure of 150 kgf/cm$^2$ for 5 minutes, and the resultant flat plate was taken as a sample for bending test. The bending test was performed under the conditions of a distance between the supports of 50 mm and a cross head rate of 10 mm/min. Some samples of this Example have a slightly small strength, but almost all of them had the same strength as that of a conventional product of Comparative Example 2.

As described above, the Test Samples of the molding material of the present invention had almost the same moldability, curing characteristics (curing time) and strength as those of a molding material of an unsaturated polyester resin which is often used industrially (referred to as a "fiber reinforced plastic"), and the dimensional stability was also sufficient. Accordingly, the molding material of the present invention can be sufficiently applied to the application where a normal FRP material is used.

Then, molding materials of these Test Samples 1-1 to 1-3 and molding materials of Comparative Examples 1 and 2 were subjected to compression molding under the conditions of a molding temperature of 150° C. and an injection pressure of 35 kg/cm to produce a cylindrical molded article having a diameter of 19 mm. Then, a decomposition test of these molded articles was performed. The test was performed by dipping them in a decomposition solution containing at least a base and a solvolyzing agent. In this Example, an aqueous 5N sodium hydroxide solution was used as the decomposition solution. The respective molded articles of the molding materials were dipped in this solution at 80° C., and then the permeation depth of the decomposition solution and surface hardness of the molded articles after subjecting to a decomposition solution dipping treatment were measured. The hardness was measured using a rubber hardness tester, assuming that the molded article after treatment becomes very brittle. The results are shown in Table 3.

TABLE 3

|  | Permeation depth of decomposition solution (mm) | Surface hardness (°) |
| --- | --- | --- |
| Test Sample 1-1 | 7 | 60 |
| Test Sample 1-2 | 5 | 64 |
| Test Sample 1-3 | 6.5 | 62 |
| Comparative Example 1 | 3 | 90 |
| Comparative Example 2 | 0.5 | 100 |

All of the molded articles of Test Samples 1-1 to 1-3 showed a large permeation depth of the decomposition solution and small surface hardness after permeation in comparison with Comparative Examples 1 and 2. In the molding materials of Test Samples 1-1 to 1-3, the decomposition solution rapidly permeates into the composition because of the presence of the addition-polymerizable monomer having a high affinity for the decomposition solution and, at the same time, the ester bond in the unsaturated polyester resin constituting the composition skeleton is solvolyzed and the binder resin loses the three-dimensional structure. As a result, the molded article is disintegrated, that is, the surface hardness becomes very small. In such way, the molding material of this Example has a very high decomposition capability.

On the other hand, the molding material of Comparative Example 2 is a material of a composition which has hitherto been used, and it can not be decomposed by such a solution containing a base and water. As in Comparative Example 1, the decomposition capability can be improved by using polycaprolactone as the low shrink agent. As in Comparative Test Samples 1-1 to 1-3, a larger decomposition capability can be obtained by introducing the addition-polymerizable monomer having a high affinity for decomposition solution.

As is apparent from a comparison between Test Sample 1-1 and Test Sample 1-2, even when the addition-polymerizable monomer having a high affinity for the decomposition solution is used, the thermoplastic polyester improves the decomposition solution permeability and is solvolyzed by oneself. Therefore, the decomposition capability is improved by using polycaprolactone which is the thermoplastic polyester, as the low shrink agent.

As described above, the molded article of the molding material of the present invention can be quickly decomposed by a decomposition solution containing sodium hydroxide and water.

In a boiling test using water, a difference between Test Samples 1-1 to 1-3 and Comparative Examples 1 and 2 was not observed. In the Test Samples of the present invention, the water resistance was the same as that of a conventional product.

The concentration of an aqueous sodium hydroxide solution is not limited to 5N as in this Example, and the solution may be prepared in a concentration of not more than 10N, more preferably within the range from 2 to 5N.

Furthermore, the temperature at decomposition treatment is not limited to the value of this Example. However, when the decomposition treatment using a pressure device is not performed, the temperature is preferably not more than the boiling point of the decomposition solution.

<EXAMPLE 2>

To 13.6 parts by weight of an unsaturated polyester (manufactured by Nippon Shokubai Co., Ltd., trade name: Epolac), added were 8.0 parts by weight of styrene as the addition-polymerizable monomer, 1.8 parts by weight of polycaprolactone (molecular weight: 40,000, manufactured by Daicel Chemical Industries, Ltd., trade name: Placcel) as the thermoplastic polyester, 6.6 parts by weight of dimethylaminopropylacrylamide and 0.3 parts by weight of tert-butyl peroxybenzoate (manufactured by NOF Corporation, trade name: Perbutyl Z) as the curing agent, followed by sufficient mixing to obtain a composition for a binder.

Then, 57 parts by weight of calcium carbonate as the filler, 2 parts by weight of zinc stearate as the release agent and 1 part by weight of magnesium oxide as the thickener were transferred to a kneader, followed by dry mixing. About 5 minutes after mixing, the previously mixed binder composition was gradually added to this uniformly mixed dry mixture, followed by kneading to obtain a uniform pasty substance.

A chopped strand obtained by cutting glass fibers with a cutter was distributed on a polyethylene film, which was impregnated with the above pasty substance to obtain a molding material. The impregnated molding material was aged after taking up a required length of the molding material, thereby thickening it to a required consistency. As a result, the glass fibers were formulated in the amount of about 30 parts by weight, based on 100 parts by weight of the pasty substance.

Since the molding material thus obtained has a sheet-like shape, it is a sort of a molding material which is normally referred to as "SMC" and is in a non-adhesive state although it contains styrene.

When this molding material is compared with FRP (fiber reinforced plastic) of an unsaturated polyester resin which is often used industrially, the moldability, curing characteristics (curing time) and strength of this molding material were almost the same as those of FRP, and the dimension stability and spiral flow length were also sufficient. Accordingly, the molding material of the present invention can be sufficiently applied to the application where a normal FRP material is used.

Then, this molding material was subjected to compression molding under the conditions of a molding temperature of 150° C. and an injection pressure of 35 kg/cm$^2$ to produce a cylindrical molded article having a diameter of 19 mm. Then, a decomposition treatment test of this molded article was performed. The test was performed by dipping it in a decomposition solution containing at least a base and a solvolyzing agent. In this Example, an aqueous 5N sodium hydroxide solution was used as the decomposition solution. For comparison, the molded article was also dipped in a decomposition solution of only water, which contains no base. The molded article of the molding material was dipped in two kinds of solutions at 80° C., and then the permeation depth of the decomposition solution and surface hardness of the molded articles after subjecting to a decomposition solution dipping treatment were measured. The hardness was measured using a rubber hardness tester. The results are shown in Table 4.

TABLE 4

| | Decomposition solution | Permeation depth of decomposition solution (mm) | Surface hardness (°) |
|---|---|---|---|
| Example 2 | Aqueous 5N—NaOH solution | 6 | 58 |
| Example 2 | Water | 0 | 100 |

By the treatment using the aqueous 5N sodium hydroxide solution, the molded article of the molding material was decomposed and is in a disintegrated state. It was in the state where any treatment (e.g. shredding, grinding, volume reduction, etc.) was easily performed, because the hardness of each part is low.

On the other hand, the molded article was not attacked at all by the treatment using water, and the surface hardness was still hard.

As described above, the molding material of the present invention is easily decomposed by the decomposition solution containing at least the base and solvolyzing solvent, but is not attacked at all by water containing no base. Accordingly, the molding material is not attacked under a normal environment, even in the humid or wet state. However, it is preferred to coat the surface for safety under the environment where it is continuously exposed to very high temperature and high humidity. In this case, a coating layer can be provided by applying a solution or suspension prepared by dissolving or suspending a resin (e.g. polyethylene, polypropylene, polystyrene, polyvinyl acetal, etc.), followed by drying. Since a thickness of the coating layer is from about 0.1 to 0.5 mm, the decomposition treatment of the molded article after coating may be performed by dipping it in the decomposition solution after removing the coating layer from the surface using a file.

<EXAMPLE 3>

Test Sample 3-1:

To 14.7 parts by weight of an unsaturated polyester (manufactured by Nippon Shokubai Co., Ltd., trade name: Epolac), added were 8.7 parts by weight of styrene as the addition-polymerizable monomer, 2.0 parts by weight of polydipropylene isophthalate, which is the thermoplastic polyester, as the low shrink agent, 4.6 parts by weight of vinyl aminoacetate and 0.3 parts by weight of tert-butyl peroxybenzoate (manufactured by NOF Corporation, trade name: Perbutyl Z) as the curing agent, followed by sufficient mixing to obtain a composition for a binder.

Then, 57 parts by weight of calcium carbonate as the filler, 2 parts by weight of zinc stearate as the release agent and 1 part by weight of magnesium oxide as the thickener were transferred to a kneader, followed by dry mixing. About 5 minutes after mixing, the previously mixed binder composition was gradually added to this uniformly mixed dry mixture, followed by kneading to obtain a uniform pasty substance.

To this pasty substance, 10 parts by weight of glass fibers were added with uniformly dispersing in the shortest possible time. The kneading was completed when the glass fibers were wetted and uniformly dispersed. In such way, a molding material was obtained.

Test Sample 3-2:

To 14.7 parts by weight of an unsaturated polyester (manufactured by Nippon Shokubai Co., Ltd., trade name: Epolac), added were 8.7 parts by weight of styrene as the addition-polymerizable monomer, 2.0 parts by weight of polycaprolactone (molecular weight: 40,000, manufactured by Daicel Chemical Industries, Ltd., trade name: Placcel) as the thermoplastic polyester, 6.5 parts by weight of diemethylaminoethyl acrylate and 0.3 parts by weight of tert-butyl peroxybenzoate (manufactured by NOF Corporation, trade name: Perbutyl Z) as the curing agent, followed by sufficient mixing to obtain a composition for a binder.

According to the same manner as that described in Test Sample 3-1 except for using the above binder composition, a molding material was obtained.

When these molding materials are compared with FRP of an unsaturated polyester resin which is often used industrially, the moldability, curing characteristics (curing time) and strength of this molding material were almost the same as those of FRP, and the dimension stability was also sufficient. Accordingly, the molding material of the present invention can be sufficiently applied to the application where a normal FRP material is used.

Then, these molding materials of Test Samples 3-1 and 3-2 were subjected to compression molding under the conditions of a molding temperature of 150° C. and an injection pressure of 35 kg/cm$^2$ to produce a cylindrical molded article having a diameter of 19 mm. Then, a decomposition treatment test of these molded articles was performed. The test was performed by dipping them in a decomposition solution containing at least a base and a solvolyzing agent. In this Example, an aqueous 3N sodium hydroxide solution was used as the decomposition solution. The molded article of the molding material was dipped in the decomposition solution at 80° C., and then the permeation depth of the decomposition solution and surface hardness of the molded article after subjecting to a decomposition solution dipping treatment were measured. The hardness was measured using a rubber hardness tester.

Fifty hours after dipping, the decomposition solution completely permeated into the molded article. The surface hardness was measured. As a result, the molded article was too soft to measure the surface hardness.

As described above, the molding material of the present invention can be converted into a very soft state by using the decomposition solution containing at least the base and water. Therefore, the volume reduction and shredding of the molding material can be performed without applying any force. When the molding material includes other parts, they can be easily peeled off and separated.

<EXAMPLE 4>

Test Sample 4-1:

Sixty Parts by weight of an unsaturated polyester were mixed with 40 parts by weight of 2-hydroxyethyl methacrylate as the addition-polymerizable monomer, and then the mixture was stirred in a nitrogen atmosphere at 100° C. for 10 minutes to obtain a liquid resin containing 60% by weight of the unsaturated polyester. Then, 30 parts by weight of polyvinyl acetate as the low shrink agent and 70 parts by weight of 2-hydroxyethyl methacrylate as the addition-polymerizable monomer were added to obtain a low shrink agent solution. To 17.71 parts by weight of the above unsaturated polyester liquid resin, added were 5.09 parts by weight of this low shrink agent solution and 0.25 parts by weight of 1,1-bis(tert-butylperoxy)3,3,5-trimethylcyclohexane (manufactured by NOF Corporation, trade name: Perhexa 3M) as the curing agent, followed by sufficient mixing to obtain a binder resin composition.

Then, 9.91 parts by weight of calcium carbonate and 50.8 parts by weight of aluminum hydroxide as the fillers, 1.24 parts by weight of zinc stearate as the release agent, 0.37 parts by weight of carbon powders as the colorant and 0.99 parts by weight of polyethylene were transferred to a kneader, followed by dry mixing. About 5 minutes after mixing, the previously mixed binder composition was gradually added to this uniformly mixed dry mixture, followed by kneading to obtain a uniform pasty substance.

To this pasty substance, 13.3 parts by weight of glass fibers were added with uniformly dispersing in the shortest possible time. The kneading was completed when the glass fibers were wetted and uniformly dispersed. In such way, a molding material was obtained.

Test Sample 4-2:

Seventy-five Parts by weight of an unsaturated polyester were mixed with 25 parts by weight of 2-hydroxyethyl methacrylate as the addition-polymerizable monomer, and then the mixture was stirred in a nitrogen atmosphere at 100° C. for 10 minutes to obtain a liquid resin containing 75% by weight of the unsaturated polyester. Then, 32.6 parts by weight of polyvinyl acetate as the low shrink agent were dissolved in 67.4 parts by weight of 2-hydroxyethyl methacrylate as the addition-polymerizable monomer to obtain a low shrink agent solution. To 15.06 parts by weight of the above unsaturated polyester liquid resin, added were 4.97 parts by weight of this low shrink agent solution, 2.63 parts by weight of styrene as the addition-polymerizable monomer and 0.25 parts by weight of 1,1-bis(tert-butylperoxy)3,3,5-trimethylcyclohexane (manufactured by NOF Corporation, trade name: Perhexa 3M) as the curing agent, followed by sufficient mixing to obtain a binder resin composition.

According to the same manner as that described in Test Sample 4-1 except for using the above binder composition, a molding material was obtained.

Test Sample 4-3:

Seventy-five Parts by weight of an unsaturated polyester were mixed with 25 parts by weight of 2-hydroxyethyl methacrylate as the addition-polymerizable monomer, and then the mixture was stirred in a nitrogen atmosphere at 100° C. for 10 minutes to obtain a liquid resin containing 75% by weight of the unsaturated polyester. Then, 32.6 parts by weight of polyvinyl acetate as the low shrink agent were dissolved in 67.4 parts by weight of 2-hydroxyethyl methacrylate as the addition-polymerizable monomer to obtain a low shrink agent solution. Furthermore, 30 parts by weight of polycaprolactonediol as the aliphatic polyester were dissolved in 70 parts by weight of styrene as the addition-polymerizable monomer to obtain an aliphatic polyester solution. To 14.31 parts by weight of the above unsaturated polyester liquid resin, added were 4.72 parts by weight of this low shrink agent solution, 3.76 parts by weight of the aliphatic polyester solution and 0.25 parts by weight of 1,1-bis(tert-butylperoxy)3,3,5 -trimethylcyclohexane (manufactured by NOF Corporation, trade name: Perhexa 3M) as the curing agent, followed by sufficient mixing to obtain a binder resin composition.

According to the same manner as that described in Test Sample 4-1 except for using the above binder composition, a molding material was obtained.

<Comparative Example 3>

To 12.02 parts by weight of an unsaturated polyester (manufactured by Nippon Shokubai Co., Ltd., trade name: Epolac), added were 9.64 parts by weight of styrene as the addition-polymerizable monomer, 1.14 parts by weight of polycaprolactone (molecular weight: 40,000, manufactured by Daicel Chemical Industries, Ltd., trade name: Placcel) as the thermoplastic polyester and 0.25 parts by weight of 1,1-bis(tert-butylperoxy)3,3,5-trimethylcyclohexane (manufactured by NOF Corporation, trade name: Perhexa 3M) as the curing agent, followed by sufficient mixing to obtain a composition for a binder.

According to the same manner as that described in Test Sample 4-1 except for using the above binder composition, a molding material was obtained.

<Comparative Example 4>

To 12.02 parts by weight of an unsaturated polyester (manufactured by Nippon Shokubai Co., Ltd., trade name: Epolac), added were 9.64 parts by weight of styrene as the addition-polymerizable monomer, 1.14 parts by weight of polystyrene (molecular weight: 40,000) and 0.25 parts by weight of 1,1-bis(tert-butylperoxy)3,3,5-trimethylcyclohexane (manufactured by NOF Corporation, trade name: Perhexa 3M) as the curing agent, followed by sufficient mixing to obtain a composition for a binder.

According to the same manner as that described in Test Sample 4-1 except for using the above binder composition, a molding material was obtained. This molding material has a conventional composition.

The molding materials obtained in Test Samples 4-1 to 4-3 and Comparative Examples 3 and 4 may be a sort of a molding material which is normally referred to as "BMC" because they have a bulk-like shape. Therefore, the molding materials are in a non-adhesive state although they contain a polymerizable monomer.

Among compositions of these molding materials, various components of the monomer and low shrink agent, which are different from each other, are summarized in Table 5. Basic physical properties of these molding materials measured are shown in Table 6.

TABLE 5

|  | Monomer | Low shrink agent | Aliphatic polyester |
| --- | --- | --- | --- |
| Test Sample 4-1 | 2-Hydroxyethyl methacrylate | Polyvinyl acetate |  |
| Test Sample 4-2 | 2-Hydroxyethyl methacrylate + Styrene | Polyvinyl acetate |  |
| Test Sample 4-3 | 2-Hydroxyethyl methacrylate + Styrene | Polyvinyl acetate | Polycaprolactonediol |
| Comparative Example 3 | Styrene | Polycaprolactone |  |
| Comparative Example 4 | Styrene | Polystyrene |  |

TABLE 6

|  | Spiral flow (cm) | Curing time (sec) | Mold shrinkage coefficient (%) | Bending strength (kgf/cm$^2$) |
| --- | --- | --- | --- | --- |
| Test Sample 4-1 | 125 | 118 | 0.17 | 6.2 |
| Test Sample 4-2 | 115 | 97 | 0.17 | 6.3 |
| Test Sample 4-3 | 87 | 88 | 0.13 | 6 |
| Comparative Example 3 | 84 | 103 | 0.16 | 5.5 |
| Comparative Example 4 | 126 | 107 | 0.15 | 6 |

The spiral flow is determined under the conditions of a molding temperature of 150° C. and an injection pressure of 100 kgf/cm$^2$. Comparative Example has the same composition as that of a molding material which has hitherto been used. Since all spiral flows of the Test Samples obtained in the Example are almost the same as those of Comparative Examples 3 and 4, no problem arises if molding is performed under the same molding conditions as those of the Comparative Examples.

The mold shrinkage coefficient illustrating a dimensional stability at the time of molding was determined under the molding conditions of a molding temperature of 150° C., a molding pressure of 100 kgf/cm$^2$ and a molding time of 10 minutes (JIS K6911). The mold shrinkage coefficient of the molding material of this Example was the same as that of a conventional mass-manufactured material of Comparative Example 4.

The curing time of the molding material of the present invention was liable to be shorter than that of a conventional product, but the moldability is sufficiently good.

The strength of the molded article was measured under the same conditions as those of Example 1. Some samples of this Example have a slightly small strength, but almost all of them had the same strength as that of a conventional product of Comparative Example 4.

As described above, when the Test Samples of the molding materials of the present invention are compared with a molding material of an unsaturated polyester resin which is often used industrially, the moldability, curing characteristics (curing time) and strength of these molding materials were almost the same as those of the molding material of the unsaturated polyester resin, and the dimension stability was also sufficient. Accordingly, the molding material of the present invention can be sufficiently applied to the application where a normal FRP material is used.

Then, the molding materials of this Example and Comparative Examples 3 and 4 were subjected to compression molding under the conditions of a molding temperature of 150° C. and an injection pressure of 35 kg/cm² to produce a cylindrical molded article having a diameter of 19 mm. Then, a decomposition treatment test of this molded article was performed. The test was performed by dipping it in a decomposition solution containing at least a base and a solvolyzing agent. In this Example, an aqueous 5N sodium hydroxide solution was used as the decomposition solution. The respective molded articles of the molding materials were dipped in this solution at 90° C. for 24 hours, and then the permeation depth of the decomposition solution and surface hardness of the molded articles after subjecting to a decomposition solution dipping treatment were measured. The hardness was measured using a rubber hardness tester, assuming that the molded article of the molding material after treatment becomes very brittle. The results are shown in Table 7.

TABLE 7

|  | Permeation depth of decomposition solution (mm) | Surface hardness (°) |
|---|---|---|
| Test Sample 4-1 | 7 | 28 |
| Test Sample 4-2 | 5.1 | 38 |
| Test Sample 4-3 | 6.2 | 37 |
| Comparative Example 3 | 2.4 | 89 |
| Comparative Example 4 | 0.4 | 98 |

All of the molded articles of this Example showed large permeation depth of the decomposition solution and small surface hardness after permeation in comparison with Comparative Examples 3 and 4. In the molding materials of this Example, the decomposition solution rapidly permeates into the composition because of the presence of 2-hydroxyethyl methacrylate as the addition-polymerizable monomer having a high affinity for decomposition solution and, at the same time, the ester bond in the unsaturated polyester resin constituting the composition skeleton is solvolyzed and the binder resin loses the three-dimensional structure. As a result, the molded article is disintegrated, that is, the surface hardness becomes very small. Accordingly, the molding material of this Example has a very high decomposition capability.

On the other hand, the molding material of Comparative Example 4 is a molding material of a composition which has hitherto been used, and it can not be decomposed by such a solution containing a base and water. As in Comparative Example 3, the decomposition capability can be improved by using polycaprolactone as the low shrink agent. As in Test Samples 4-3, a larger decomposition capability can be obtained by introducing the addition-polymerizable monomer having a high affinity for decomposition solution.

As is apparent from a comparison between Test Sample 4-2 and Test Sample 4-3, even when 2-hydroxyethyl methacrylate is used as the addition-polymerizable monomer having a high affinity for decomposition solution, the thermoplastic polyester improves the decomposition solution permeability and is solvolyzed by oneself. Therefore, the decomposition capability is improved by using polycaprolactonediol, which is the thermoplastic polyester, as the low shrink agent.

As described above, regarding the molding material of the present invention, a three-dimensional structure having an ester bond at the main chain and a 2-hydroxyl group having a high affinity for decomposition solution at the crosslinked chain is formed by copolymerization of the unsaturated polyester and addition-copolymerizable monomer after curing, and the molded material is in a state where the low shrink agent is dispersed in the three-dimensional structure. Therefore, by dipping the molding material after curing in the decomposition solution containing the base and solvolyzing solvent, the decomposition solution quickly permeates into the composition because of the presence of the addition-polymerizable monomer and, at the same time, some ester bonds in the unsaturated polyester resin constituting the composition skeleton are solvolyzed and the binder resin loses the three-dimensional structure. Therefore, the molded article is disintegrated.

By containing polycaprolactone, which is the thermoplastic polyester, as the low shrink agent and polycaprolactonediol as the aliphatic polyester, the affinity for decomposition solution containing at least the base and solvolyzing solvent and solvolytic properties are high and solvolysis of a crosslinked structure of the unsaturated polyester resin as the binder effectively proceeds in good efficiency.

When the aliphatic polyester is contained, it can be dispersed, simply and stably, by formulating after dissolving it in a monomer having a solubility as in Test Sample 4-3.

When the aliphatic polyester is contained, it may be formulated in the shape of powders, fibers, needles and the like, as a matter of course.

In a boiling test using water, a difference between Test Samples 4-1 to 4-3 and Comparative Examples 3 and 4 was not observed. In the Test Samples of the present invention, the water resistance was the same as that of a conventional product.

<EXAMPLE 5>

Test Sample 5-1:

An unsaturated polyester, 2-hydroxyethyl methacrylate and styrene as the addition-polymerizable monomers were mixed in various formulation ratios, and then the mixture was stirred in a nitrogen atmosphere at 100° C. for 10 minutes to obtain seven kinds of unsaturated polyester liquid resins, respectively. Then, 30 parts by weight of polycaprolactone (manufactured by Daicel Chemical Industries, Ltd., trade name: Placcel), which is the low shrink agent and is also the aliphatic polyester, were added to 70 parts by weight of a mixture of styrene and 2-hydroxyethyl methacrylate as the addition-polymerizable monomers in a weight ratio of 1:1 to obtain a low shrink agent solution. To 17.71 parts by weight of the above unsaturated polyester liquid resin, added were 5.09 parts by weight of this low shrink agent solution and 0.25 parts by weight of 1,1-bis(tert-butylperoxy)3,3,5-trimethylcyclohexane (manufactured by NOF Corporation, trade name: Perhexa 3M) as the curing agent, followed by sufficient mixing to obtain seven kinds of resin compositions for a binder.

The formulation ratio of the unsaturated polyester, 2-hydroxyethyl methacrylate and styrene in the respective unsaturated polyester liquid resins as well as the molar fraction of 2-hydroxyethyl methacrylate in the addition-copolymerizable monomer in the binder resin composition are summarized in Table 8.

TABLE 8

| 2-Hydroxyethyl methacrylate (molar fraction) | Formulation ratio (weight ratio) | | |
|---|---|---|---|
| | Unsaturated polyester | 2-Hydroxyethyl methacrylate | Styrene |
| 0.2 | 11.33 | 0.58 | 5.79 |
| 0.3 | 11.21 | 1.73 | 4.77 |
| 0.4 | 11.09 | 2.85 | 3.77 |
| 0.5 | 10.97 | 3.94 | 2.8 |
| 0.6 | 10.85 | 5.01 | 1.84 |
| 0.7 | 10.74 | 6.06 | 0.91 |
| 0.8 | 10.63 | 7.08 | 0 |

Then, 9.91 parts by weight of calcium carbonate and 50.8 parts by weight of aluminum hydroxide as the fillers, 1.24 parts by weight of zinc stearate as the release agent, 0.37 parts by weight of carbon powders as the colorant and 0.99 parts by weight of polyethylene were transferred to a kneader, followed by dry mixing. About 5 minutes after mixing, the previously mixed binder composition was gradually added to this uniformly mixed dry mixture, followed by kneading to obtain a uniform pasty substance.

To this pasty substance, 13.63 parts by weight of glass fibers were added with uniformly dispersing in the shortest possible time. The kneading was completed when the glass fibers were wetted and uniformly dispersed. In such way, seven kinds of molding materials having various binder resin components were obtained.

Then, seven kinds of these molding materials were subjected to compression molding under the conditions of a molding temperature of 150° C. and an injection pressure of 35 kg/cm$^2$ to produce a cylindrical molded article having a diameter of 19 mm. Then, a decomposition treatment test of this molded article was performed. The test was performed by dipping it in a decomposition solution containing at least a base and a solvolyzing agent. In this Example, an aqueous 5N sodium hydroxide solution was used as the decomposition solution. The respective molded articles of the molding materials were dipped in this solution at 90° C. for 24 hours, and then the permeation depth of the decomposition solution and surface hardness of the molded articles after subjecting to a decomposition solution dipping treatment were measured. The hardness was measured using a rubber hardness tester, assuming that the molded article after treatment becomes very brittle. The results are shown in Table 9.

TABLE 9

| 2-Hydroxyethyl methacrylate (molar fraction) | Permeation depth of decomposition solution (mm) | Surface hardness (°) |
|---|---|---|
| 0.2 | 2.2 | 78 |
| 0.3 | 2.9 | 68 |
| 0.4 | 4.1 | 54 |
| 0.5 | 4.9 | 45 |
| 0.6 | 6.1 | 33 |
| 0.7 | 7.2 | 28 |
| 0.8 | 8.1 | 25 |

The larger the molar fraction of 2-hydroxyethyl methacrylate in the addition-polymerizable monomer, the higher the permeability of the decomposition reaction becomes. Also, the surface hardness after the decomposition treatment becomes lower. The presence of 2-hydroxyethyl methacrylate improves the decomposition properties of the molding material. Particularly, when the molar fraction of 2-hydroxyethyl methacrylate is not less than 0.4, the surface hardness after the decomposition treatment is low. It was in the state where any treatment (e.g. shredding, grinding, volume reduction, peeling, etc.) is easily performed by a hand method, because the hardness after the decomposition treatment is low.

Since the unsaturated polyester resin has hitherto been a styrene solution of the unsaturated polyester, it was difficult to increase the content of 2-hydroxyethyl methacrylate in the addition-polymerizable monomer without increasing the total amount of the monomers relative to the unsaturated polyester. However, a binder resin having high decomposition properties, wherein the molar fraction of 2-hydroxyethyl methacrylate in the total addition-polymerizable monomer is not less than 0.4, can be made by using a liquid resin prepared by dissolving the unsaturated polyester in 2-hydroxyethyl methacrylate or a mixture of styrene and 2-hydroxyethyl methacrylate as in this Example.

As described above, regarding the molding material of the present invention, a three-dimensional structure having an ester bond at the main chain and a 2-hydroxyl group having a high affinity for decomposition solution at the crosslinked chain is formed by copolymerization of the unsaturated polyester and addition-copolymerizable monomer after curing, and the molded material is in a state where the low shrink agent is dispersed in the three-dimensional structure. Therefore, by dipping the molding material after curing in the decomposition solution containing the base and solvolyzing solvent, the decomposition solution quickly permeates into the composition because the substitution rate of a 2-hydroxyethyl group is high and, at the same time, some ester bonds in the unsaturated polyester resin constituting the composition skeleton are solvolyzed and the binder resin loses the three-dimensional structure. Therefore, the molded article is disintegrated.

In the above Example, explanation was made by taking 2-hydroxyethyl methacrylate as an example. In the case of 2-hydroxyethyl acrylate, the same tendency can be obtained.

As a matter of course, 2-hydroxyethyl methacrylate and 2-hydroxyethyl acrylate may be simultaneously formulated and the sum of the molar fractions of the both in the addition-polymerizable monomer may be not less than 0.04.

<EXAMPLE 6>

Test Sample 6-1:

Sixty Parts by weight of an unsaturated polyester were mixed with 40 parts by weight of 2-hydroxyethyl methacrylate as the addition-polymerizable monomer, and then the mixture was stirred in a nitrogen atmosphere at 100° C. for 10 minutes to obtain a liquid resin containing 60% by weight of the unsaturated polyester. Then, 30 parts by weight of polycaprolactone (manufactured by Daicel Chemical Industries, Ltd., trade name: Placcel) were dissolved in 70 parts by weight of acrylic acid as the addition-polymerizable monomer to obtain a low shrink agent solution. To 17.71 parts by weight of the above unsaturated polyester liquid resin, added were 5.09 parts by weight of this low shrink agent solution and 0.25 parts by weight of 1,1-bis(tert-butylperoxy)3,3,5-trimethylcyclohexane (manufactured by NOF Corporation, trade name: Perhexa 3M) as the curing agent, followed by sufficient mixing to obtain a binder resin composition.

Then, 57 parts by weight of calcium carbonate as the filler, 2 parts by weight of zinc stearate as the release agent and 1 part by weight of magnesium oxide as the thickener were transferred to a kneader, followed by dry mixing. About 5 minutes after mixing, the previously mixed binder composition was gradually added to this uniformly mixed dry mixture, followed by kneading to obtain a uniform pasty substance.

A chopped strand obtained by cutting glass fibers with a cutter was distributed on a polyethylene film, which was impregnated with the above pasty substance to obtain a molding material. The impregnated molding material was aged after taking up a required length of the molding material, thereby thickening it to a required consistency. As a result, the glass fibers were formulated in an amount of about 30 parts by weight, based on 100 parts by weight of the pasty substance.

Test Sample 6-2:

Sixty Parts by weight of an unsaturated polyester were mixed with 40 parts by weight of 2-hydroxyethyl methacrylate as the addition-polymerizable monomer, and then the mixture was stirred in a nitrogen atmosphere at 100° C. for 10 minutes to obtain a liquid resin containing 60% by weight of the unsaturated polyester. Then, 30 parts by weight of a methyl methacrylate-butadiene-styrene copolymer (MBS resin) as the low shrink agent were dissolved in 70 parts by weight of 2-hydroxyethyl acrylate as the addition-polymerizable monomer to obtain a low shrink agent solution. To 13.83 parts by weight of the above unsaturated polyester liquid resin, added were 3.97 parts by weight of this low shrink agent solution and 5 parts by weight of polylactic acid (manufactured by Shimadzu Corporation, trade name: Lacty) in the form of particles as the aliphatic polyester. Finally, 0.25 parts by weight of 1,1-bis(tert-butylperoxy)3,3,5-trimethylcyclohexane (manufactured by NOF Corporation, trade name: Perhexa 3M) as the curing agent were added, followed by sufficient mixing to obtain a binder resin composition.

According to the same manner as that described in Test Sample 6-1 except for using the above binder composition, a molding material was obtained.

Since the molding materials of Test Samples 6-1 and 6-2 have a sheet-like shape, they may be a sort of a molding material which is normally referred to as "SMC" and are in a non-adhesive state although they contain styrene.

When the molding materials of Test Samples 6-1 and 6-2 are compared with FRP of an unsaturated polyester resin which is often used industrially, the moldability, curing characteristics (curing time) and strength of these molding materials were almost the same as those of FRP, and the dimension stability was also sufficient. Therefore, it is found that an MBS (methyl methacrylate-butadiene-styrene) resin or polycaprolactone as the thermoplastic polyester serves as the low shrink agent. Accordingly, the molding materials of the present invention can be sufficiently applied to the application where a normal FRP material is used.

Then, the molding materials of Test Samples 6-1 and 6-2 were subjected to compression molding under the conditions of a molding temperature of 150° C. and an injection pressure of 35 kg/cm² to produce a cylindrical molded article having a diameter of 19 mm. Then, a decomposition treatment test of these molded articles was performed. The test was performed by dipping them in a decomposition solution containing at least a base and a solvolyzing agent. In this Example, an aqueous 4N sodium hydroxide solution was used as the decomposition solution. For comparison, the molded article was also dipped in a decomposition solution of only water, which contains no base. The molded articles of the molding materials were dipped in the respective decomposition solutions at 90° C., and then the permeation depth of the decomposition solution and surface hardness of the molded articles after subjecting to a decomposition solution dipping treatment were measured. The hardness was measured using a rubber hardness tester. The results are shown in Table 10.

TABLE 10

| | Permeation depth of decomposition solution (mm) | Surface hardness (°) |
|---|---|---|
| Test Sample 6-1 | 7.2 | 28 |
| Test Sample 6-2 | 7.1 | 26 |

Within 24 hours after dipping, the decomposition solution completely permeated into the molded article and all molded articles showed high decomposition properties. After 24 hours, the molded article was too soft to measure the surface hardness. That is, the molded article was in the state where any treatment (e.g. shredding, grinding, volume reduction, etc.) is easily performed. The molding material containing 2-hydroxyethyl acrylate or 2-hydroxyethyl methacrylate having a high affinity for decomposition solution exhibits excellent decomposition properties to the decomposition solution as a solvolyzing solution containing at least the base and water.

On the other hand, the molded article was not attacked at all due to the treatment using water, and the surface hardness was still hard.

As is apparent from Test Samples 6-1 and 6-2, the molding material of the present invention can be converted into a very soft state by using the decomposition solution containing at least the base and water. Therefore, the volume reduction and shredding of the molding material can be performed without applying any force. When the molding material includes other parts, they can be easily peeled off and separated. On the other hand, the molding material of the present invention is not attacked at all by water containing no base. Accordingly, the molding material is not attacked under a normal environment, even in the humid or wet state. However, it is preferred to coat the surface for safety under the environment where it is continuously exposed to high temperature and high humidity. In this case, a coating layer can be provided by applying a solution or suspension prepared by dissolving or suspending a resin (e.g. polyethylene, polypropylene, polystyrene, polyvinyl acetal, etc.), followed by drying. Since a thickness of the coating layer is from about 0.1 to 0.5 mm, the decomposition treatment of the molded article after coating may be performed by dipping in the decomposition solution after removing the coating layer from the surface using a file.

Since acrylic acid sometimes receives a gelation action from iron, it is preferred not to use pure iron in the vicinity of a mold at the time of molding the molding material containing acrylic acid.

An aliphatic polyester which enhances the decomposition properties can be formulated in the shape of particles as in Test Sample 6-2. It is also possible to formulate in the state of being dissolved in a monomer.

In Test Sample 6-2, polylactic acid as the aliphatic polyester was contained in the shape of particles, but it may be in the shape of fibers or needles.

The construction and production process of the molding material are not limited to those described in Examples 1 to 6. For example, fillers (e.g. calcium carbonate, calcium silicate, barium sulfate, aluminum hydroxide, talc, mica, etc.), reinforcers (e.g. glass fiber, carbon fiber, etc.), thickeners, release agents and colorants may be formulated.

In Examples 1 to 6, the compression molding was used at the time of molding the molding material, but the transfer molding or injection molding may be used.

In Examples 1 and 3 to 5, the molding material having the bulk-like shape was explained and, in Examples 2 and 6, SMC having the sheet-like shape was explained. In addition to them, granular PMC (pelletized type molding compound) may be used.

In Examples 1 to 6, the example of molding into the cylindrical shape was used, but is not limited thereto. The molded article having other shape, paint, putty, adhesive, etc. may be used.

The solution used for dipping the molded article of the molding material of the present invention, thereby to perform the decomposition treatment is not limited to the composition and formulation ratio of the above Examples, and it may be a solution containing at least a base and a solvolyzing agent. Examples of the base include metal hydroxides (e.g. sodium hydroxide, potassium hydroxide, etc.), metal oxides (e.g. sodium oxide, calcium oxide, etc.) and metal alkoxides (e.g. sodium ethoxide, potassium t-butoxide, etc.), in addition to sodium hydroxide described in the above Examples. These can be used alone or in combination. As the solvolyzing solvent, ethanol, methanol, ethylene glycol, ammonia, acetic acid, hydrazine, etc. can be formulated, in addition to water used in the above Examples.

It is also possible to use diethanolamine, which serves as the base and solvolyzing solvent, alone.

In addition to the solvolyzing solvent, solvents (e.g. diethyl ether, dioxane, tetrahydrofuran, acetone, dimethylformamide, dimethylamine, etc.) can be used alone or in combination in the decomposition solution.

The temperature at the time of performing the decomposition treatment is not limited to the value of the Examples, as a matter of course.

The final molded article obtained from the molding material of the present invention can be used in various fields such as construction materials (e.g. bath, filth-treating tank, water storage tank, washstand, etc.), household products (e.g. chair, desk, furniture, etc.), civil engineering materials (e.g. tile, artificial marble, pipe, etc.), bodies or parts of transports (e.g. ship, automobile, railroad, aircraft, etc.), residential apparatuses, decorative laminated materials, decorative articles and the like.

<EXAMPLE 7>

Next, Examples of the molded motor of the present invention will be explained.
Test Sample 7-1:

Sixty-one Parts by weight of an unsaturated polyester were mixed with 34 parts by weight of 2-hydroxyethyl methacrylate and 5 parts by weight of styrene as the addition-polymerizable monomers, and then the mixture was stirred in a nitrogen atmosphere at 100° C. for 10 minutes to obtain an unsaturated polyester liquid resin. Then, 30 parts by weight of polycaprolactone (manufactured by Daicel Chemical Industries, Ltd., trade name: Placcel) which is the low shrink agent and is also the thermoplastic polyester was added to 70 parts by weight of a mixture of styrene and 2-hydroxyethyl methacrylate as the addition-polymerizable monomers in a weight ratio of 1:1 to obtain a low shrink agent solution. To 17.71 parts by weight of the above unsaturated polyester liquid resin, added were 5.09 parts by weight of this low shrink agent solution and 0.25 parts by weight of 1,1-bis(tert-butylperoxy)3,3,5-trimethylcyclohexane (manufactured by NOF Corporation, trade name: Perhexa 3M) as the curing agent, followed by sufficient mixing to obtain a composition for a binder.

Then, 9.91 parts by weight of calcium carbonate and 50.8 parts by weight of aluminum hydroxide as the fillers, 1.24 parts by weight of zinc stearate as the release agent, 0.37 parts by weight of carbon powders as the colorant and 0.99 parts by weight of polyethylene were transferred to a kneader, followed by dry mixing. About 5 minutes after mixing, the previously mixed binder composition was gradually added to this uniformly mixed dry mixture, followed by kneading to obtain a uniform pasty substance.

To this pasty substance, 13.63 parts by weight of glass fibers were added with uniformly dispersing in the shortest possible time. The kneading was completed when the glass fibers were wetted and uniformly dispersed. In such way, a molding material was obtained.

This molding material and an iron core on which a winding is wound through an insulating material were integrally molded at 150° C. to produce a molded stator as shown in FIG. 1. After this molded stator was dipped in an aqueous 5N sodium hydroxide solution at 90° C. for 24 hours, a trial of removing the molding material was made. As a result, it was possible to remove the molding material by hand, thereby separating the winding and iron core.

Furthermore, the molding material remaining partially on the winding can be completely removed by dipping in the same solution for 8 hours.
Test Sample 7-2:

Seventy-one Parts by weight of an unsaturated polyester were mixed with 29 parts by weight of styrene as the addition-polymerizable monomer, and then the mixture was stirred in a nitrogen atmosphere at 100° C. for 10 minutes to obtain an unsaturated polyester liquid resin. Then, 29 parts by weight of polydipropylene adipate, which is the low shrink agent and is also the thermoplastic polyester, were added to 71 parts by weight of 2-hydroxyethyl methacrylate as the addition-polymerizable monomer to obtain a low shrink agent solution. To 14.35 parts by weight of the above unsaturated polyester liquid resin, added were 7.45 parts by weight of this low shrink agent solution and 0.25 parts by weight of 1,1-bis(tert-butylperoxy)3,3,5-trimethylcyclohexane (manufactured by NOF Corporation, trade name: Perhexa 3M) as the curing agent, followed by sufficient mixing to obtain a composition for a binder.

Then, 17.86 parts by weight of calcium carbonate and 8.48 parts by weight of aluminum hydroxide as the fillers, 1.53 parts by weight of zinc stearate as the release agent and 0.38 parts by weight of carbon powders as the colorant were transferred to a kneader, followed by dry mixing. About 5 minutes after mixing, the previously mixed binder composition was gradually added to this uniformly mixed dry mixture, followed by kneading to obtain a uniform pasty substance.

To this pasty substance, 9.70 parts by weight of glass fibers were added with uniformly dispersing in the shortest possible time. The kneading was completed when the glass fibers were wetted and uniformly dispersed. In such way, a molding material was obtained.

This molding material and an iron core on which a winding is wound through an insulating material were integrally molded at 150° C. to produce a molded stator as shown in FIG. 1. After this molded stator was dipped in an aqueous 5N sodium hydroxide solution at 90° C. for 24 hours, a trial of removing the molding material was made. As a result, it was possible to remove the molding material by hand, thereby separating the winding and iron core.

Furthermore, the molding material remaining partially on the winding can be completely removed by dipping in the same solution for 10 hours.

As described above, regarding the molded motor obtained by coating the winding and iron core with the molding material of the present invention, followed by molding, the molded part is decomposed and disintegrated by dipping in the decomposition solution of the base and solvolyzing solvent. Therefore, it is in the state where peeling is easily performed and the molded part can be easily separated from the iron core and winding. That is, it is a molded motor whose recovery of the metal as a valuable material is extremely high.

The molding material used for the molded motor is not limited to the composition of this Example and may be any molding material of the present invention.

INDUSTRIAL APPLICABILITY

As described above, according to the present invention, there can be provided a molding material and a molded motor, which can be easily decomposed by using an alkaline solution. Accordingly, the molding material of the present invention can be used for various structural materials and, besides, waste disposal after use can be easily performed. Regarding the molded motor of the present invention, a metal of value (e.g. iron core, winding, etc.) can be recovered after use.

We claim:

1. A molded motor comprising a molded part of an iron core, a winding and a molding material, wherein the molded part is integrally molded so as to coat at least one part of the iron core and winding with the molding material, the molding material contains, as a binder, a thermosetting composition of an unsaturated polyester, an addition-polymerizable monomer and a low shrink agent, the addition-polymerizable monomer containing a monomer having an affinity for alkaline solution, and wherein the molding material has a three-dimensional structure, the low shrink agent is dispersed in the three-dimensional structure and when the molding material is subjected to an alkaline solution, the three-dimensional structure is affected and the surface hardness of the molding material is reduced thereby facilitating separation of the molded part from the iron core and waste disposal of the molding material.

2. The molded motor according to claim 1, wherein the monomer having an affinity for alkaline solution is selected from the group consisting of a carboxylic acid having an ethylene bond, a sulfonic acid having an ethylene bond, a metal salt of the carboxylic or sulfonic acid, a first ester synthesized from the carboxylic or sulfonic acid and an alcohol, an amide synthesized from the carboxylic or sulfonic acid and an amine, a second ester synthesized from an alcohol having an ethylene bond and a carboxylic or sulfonic acid, and an acid anhydride having an ethylene bond.

3. The molded motor according to claim 1, wherein the addition-polymerizable monomer is at least one selected from hydroxyethyl acrylate and hydroxyethyl methacrylate.

4. The molded motor according to claim 1, wherein the low shrink agent is a thermoplastic polyester.

5. The molded motor according to claim 4, wherein the thermoplastic polyester is at least one selected form the group consisting of polycaprolactone, polypropiolactone, polyethylene adipate, polybutylene adipate, polydipropylene adipate, polypropylene adipate, polytetramethylene adipate, polyethylene succinate, polybutylene succinate, polydipropylene succinate, polypropylene succinate, polytetramethylene succinate, polyethylene phthalate, polypropylene phthalate, polydipropylene phthalate, polybutylene phthalate, polyethylene isophthalate, polypropylene isophthalate, polydipropylene isophthalate, and polydibutylene isophthalate.

6. The molded motor according to claim 1, wherein the molding material further comprises at least one aliphatic polyester selected from the group consisting of polylactic acid, polyglycolic acid, polycaprolactone diol, polycaprolactone triol, and a copolymer of 3-hydroxyalkanoate.

7. A molded motor comprising a molded part of an iron core, a winding and a molding material, wherein the molded part is integrally molded so as to coat at least one part of the iron core and winding with the molding material, the molding material contains, as a binder, a thermosetting composition of an unsaturated polyester, an addition-polymerizable monomer and a low shrink agent, the addition-polymerizable monomer containing a monomer having an affinity for alkaline solution, and wherein the molding material has a three-dimensional structure, the low shrink agent is dispersed in the three-dimensional structure and when the molding material is subjected to an alkaline solution, at least a portion of the three-dimensional structure is disintegrated and the surface hardness of the molding material is reduced thereby facilitating separation of the molded part from the iron core and waste disposal of the molding material.

\* \* \* \* \*